July 5, 1960   A. EISELE   2,943,396
BORE CONCENTRICITY GAUGE
Filed Sept. 14, 1956   2 Sheets-Sheet 1
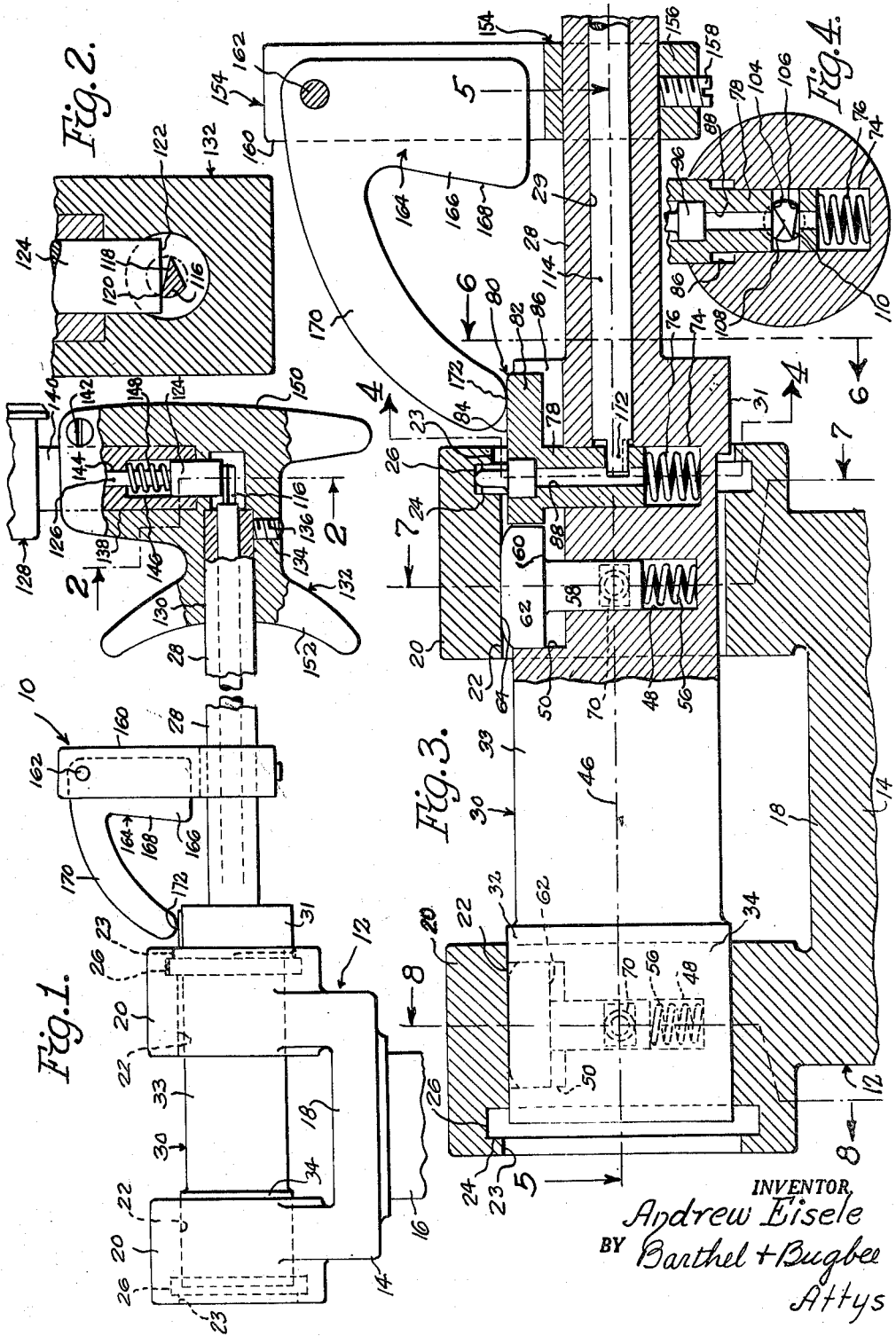
INVENTOR,
Andrew Eisele
BY Barthel + Bugbee
Attys

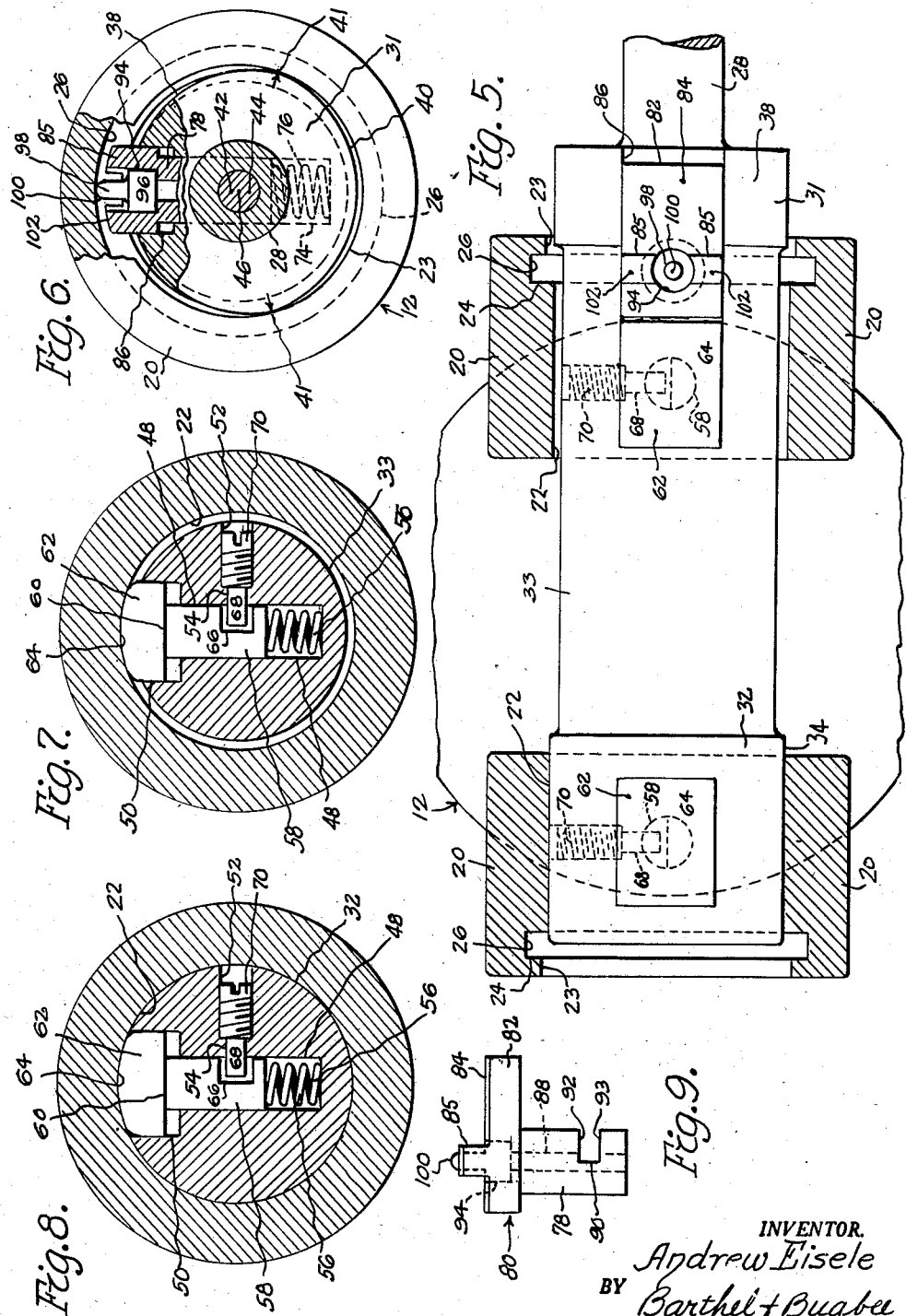

United States Patent Office 2,943,396
Patented July 5, 1960

2,943,396
BORE CONCENTRICITY GAUGE
Andrew Eisele, 150 Cheyenne Ave., Detroit 27, Mich.
Filed Sept. 14, 1956, Ser. No. 609,964
2 Claims. (Cl. 33—174)

This invention relates to bore gauges and, in particular, to bore concentricity gauges.

One object of this invention is to provide a bore concentricity gauge for testing the concentricity of one bore relatively to another intendedly coaxial bore and enable any departures from concentricity or coaxiality to be indicated directly upon the scale of a measuring instrument, such as a conventional dial indicator.

Another object is to provide a bore concentricity gauge of the foregoing character which tests the concentricity of a bore which lies between two other bores of smaller diameter such as, for example, the concentricity of a stepped or recessed bore, such as the bottom surface of an internal groove intermediate the ends of two bores of smaller diameters than the diameter of the bottom surface of the groove.

Another object is to provide a bore concentricity gauge of the foregoing character wherein means is provided for retracting the feeler or measuring pin while inserting it in the main bore in order to enable it to be released when it arrives in registry with the minor bore or groove and to enable it to be withdrawn without injury, after measurement.

Another object is to provide a bore concentricity gauge of the foregoing character wherein the gauge is provided with pilot portions enabling the accurate checking of the concentricity of grooves formed in axially-spaced bores by providing guidance for the instrument in one bore while checking the concentricity of the groove in the other bore.

Other objects and advantages of the invention will become apparent during the course of the following description of the accompanying drawings, wherein:

Figure 1 is a side elevation, partly in section, of a bore concentricity gauge according to one form of the invention;

Figure 2 is an enlarged fragmentary cross-section taken along the line 2—2 in Figure 1;

Figure 3 is an enlarged fragmentary central vertical section through the left-hand end portion of the bore concentricity gauge shown in Figure 1;

Figure 4 is a cross-section taken along the line 4—4 in Figure 3;

Figure 5 is a horizontal section taken along the line 5—5 in Figure 3;

Figure 6 is a cross-section, partly in end elevation, taken along the line 6—6 in Figure 3;

Figure 7 is a cross-section taken along the line 7—7 in Figure 3;

Figure 8 is a cross-section taken along the line 8—8 in Figure 3; and

Figure 9 is a side elevation of the measuring plunger assembly through which runs the section line 4—4 in Figure 3.

Referring to the drawings in detail, Figure 1 shows a bore concentricity gauge, generally designated 10, adapted for the measurement of bore concentricity in a workpiece 12 which, for purposes of example, is shown as a universal joint yoke 14 connected to an automobile drive shaft 16. The workpiece 14 consists of a bridge portion 18 adapted to be connected to the drive shaft 16 or made integral therewith, the bridge portion 16 having laterally-spaced aligned bosses or heads 20 containing aligned coaxial bores 22 and counterbores 23, each bore 22 and counterbore 23 having a groove 24 therebetween. The grooves 24 are spaced inwardly from the ends of the heads 20 and have bottom surfaces 26 constituting recessed bores, the concentricity of which is to be measured relatively to the main bore 22 or counterbore 23 in each head 20. The grooves 24, for example, may be provided for the purpose of receiving retaining rings, such as snap rings (not shown).

The bore concentricity gauge 10 is provided with a hollow tubular support or stem 28 having a bore 29 therethrough and an enlarged head 30 on one end thereof and integral therewith (Figure 3). The head 30 at its opposite ends has enlargements 31 and 32 respectively adjacent the remote from the stem 28, with a cylindrical portion 33 therebetween. The enlargement 32 has a cylindrical surface 34 adapted to slidably fit the bores 22, whereas the enlargement 31 has a surface 36 composed of two incomplete cylindrical surfaces 38 and 40 (Figure 6) of different radii meeting at junction or bore-contacting lines of contact 41 seen end-on as points in Figure 6 and having different centers or axes 42 and 44 respectively located on opposite sides of the axis 46 of the stem 28 and head 30 and adapted to fit the counterbores 23 in such a manner that, as shown in Figure 6, the enlargement 31 is accurately centered in the counterbore 23 in which it is inserted and rotated during measurement. The lines of contact 41 result from the geometrical fact that two cylinders of different axes intersect in lines of intersection rather than in points of intersection, thus increasing the accuracy of engagement with the bore and reducing wear. The enlargement 32 and the cylindrical portion 33 have radial sockets 48 (Figures 7 and 8) terminating at their outer ends in enlarged rectangular counterbores 50 respectively, with perpendicular threaded radial bores 52 terminating at their inner ends in smaller diameter smooth bores 54.

Seated in the bottom of each socket 48 is a coil spring 56 which urges upward or outward the shank 58 of a bore-contacting plunger 60 having a rectangular head 62 (Figure 5) with a rounded cylindrical contact surface 64 accurately fitting the main bore 22 as is self-evident from Figure 7. The head 62 is of less thickness than the depth of the counterbore 50, so as to be capable of being pushed below the level of the surfaces 33 or 34 as the case may be (Figures 7 and 8). Each of the shanks 58 of the plungers 60 is provided with a notch 66 which is engaged by the reduced diameter nose portion 68 of a headless set screw 70 threaded into the respective threaded bore 52. The nose portion 68 fits the reduced diameter bore 54 and projects into the notch 66 so as to serve as a stop for limiting the stroke of its respective plunger 60.

Adjacent the radial shoulder 72 between the stem 28 and its head 30 (Figure 3), the enlargement 31 is provided wtih a radial socket 74 forming a transverse rectilinear guideway receiving a coil spring 76 engaging the inner end of the stem 78 of a measuring plunger unit 80. The measuring plunger unit 80 (Figures 3 and 9) has a rectangular head 82 with a cylindrical surface 84 thereon offset longitudinally relatively to the shank 78 and provided with an interrupted arcuate ridge 85. The rectangular head 82 slidably fits a channel 86 extending longitudinally from the radial shoulder 72 to the counterbore 50. The stem 78 is provided with a central bore 88 (Figures 3, 4 and 9) intersected by a notch 90 having accurately machined parallel side surfaces 92 and 93. The outer end of the bore 88 terminates in a counterbore 94 (Figure 6) which interrupts the arcuate ridge 85 in its center and receives the base 96 of a bore-contacting pin 98 having a rounded bore-contacting end or tip 100 adapted to engage the bottom 26 of the groove 24 in the workpiece 12. The bore-contacting pin 98 is removable from the counterbore 94 in order to be replaced when worn, broken or for other reasons. The curvature of the top surface 102 of the interrupted ridge 85 is cylindrical and concentric with the curvature of the bottom surface 26 of the groove 24, the concentricity of which is to be measured, when the rounded end 100 of the measuring pin 98 is engaged with the surface 26 (Figure 6).

The parallel opposite sides 92 and 93 of the notch 90 are engageable by the sharp edges 104 and 106 respectively of the mutually-acute-angled surfaces 108 and 110 on opposite sides of the cutaway end portion 112 of a rotary motion-transmitting rod 114. The latter is rotatably mounted in the bore 29 of the stem 28 and at its opposite end is provided with a similar cutaway portion 116 (Figures 1 and 2) having a flat surface 118 thereon provided with a sharp edge 120 which engages the accurately flat lower end 122 of the head 124 on a plunger 126 of a conventional dial indicator, generally designated 128. The stem 28 fits snugly into a socket 130 in a handle, generally designated 132, having a transverse threaded bore 134 receiving a locking set screw 136. The handle 132 is provided with a second socket 138 which snugly receives the shank or stem 140 of the dial indicator 128, the handle 132 being split and provided with a clamping screw 142 to clamp the stem 140 in its socket 138. The stem 140 is provided with a bore 144 slidably receiving the plunger 126 and a counterbore 146 slidably receiving the head 124. A compression spring 148 urges the head 124 downward against the cutaway end portion 116 of the motion-transmitting rod 114. The handle 132, as its name suggests, is formed to fit the palm of the hand and has a convexly-curved palm rest 150 on one side and a concavely-curved finger rest 152 on its opposite side (Figure 1).

Mounted on the stem 28 intermediate the handle 132 and the head 30 is a bracket 154 having a hub 156 bored to receive the stem 28 and bored and threaded transversely to receive a clamping screw 158. The bracket 154 has a yoke portion 160 bored to receive a pivot pin 162 (Figures 1 and 3) on which is pivotally mounted a bent lever 164. The bent lever 164 has a trigger arm 166 with a finger grip surface or edge 168 and an arcuate arm or finger 170 having a rounded nose portion or tip 172 adapted to engage the upper surface 84 of the head 82 of the measuring plunger unit 80. The bracket 154 is mounted on the stem 28 at a convenient distance from the handle 132 so that one or more of the fingers may be shifted from the concave edge 152 of the handle 132 to engage the edge 168 of the trigger arm 166 to actuate the bent lever 164, as described below in connection with the operation of the invention.

*Operation*

In the operation of the invention, let it be assumed that the concentricity of the bottom surface 26 of a groove 24 is to be measured relatively to a counterbore 23 from the opposite ends of which it is spaced (Figure 3) and that in this case (though not necessarily) the workpiece 12 contains a pair of spaced bosses or heads 20 containing a pair of coaxial spaced bores 22 and counterbores 23, each having such a groove 24 therebetween. The operator grasps the handle 132 with the convex portion 150 in his palm and three of his fingers in the concave portion 152 while the fourth engages and pulls upon the edge 168 of the trigger arm 166 so as to swing the bent lever 164 and depress the measuring plunger unit 80. While holding the instrument 10 in this manner, the operator aligns the head 30 on the stem 28 with the bores 22 and counterbores 23 and pushes the enlargement 32 through the nearer counterbore 23 and bore 22 across the space between the bosses 20 and into the farther bore 22 and counterbore 23 so that the cylindrical surface 34 on the enlargement 32 snugly but slidably engages the farther bore 22. While so doing, the operator necessarily pushes the enlargement 34 (Figures 3 and 6) into the nearer counterbore 23, with the surface of the latter snugly engaged by the junction points or bore-contacting points 41 (Figure 6). The spring-urged bore-contacting plungers 60 yieldingly maintain such engagement.

Since the measuring plunger unit 80 is momentarily depressed by the action of the operator's finger upon the trigger arm 166 of the bent lever 164, the measuring pin 98 is enabled to pass through the counterbore 23 and enter the groove 24. The operator then releases the pressure of his finger upon the trigger arm 166 whereupon the spring 76 (Figure 3) pushes the measuring plunger unit 80 outward and consequently pushes the rounded end 100 of the measuring pin 98 into engagement with the bottom surface 26 of the groove 24. The operator then rotates the instrument 10 by turning the handle 132 to and fro, at the same time watching the needle (not shown) on the graduated dial of the dial indicator 128. If the needle remains motionless relatively to the graduations of the dial indicator 128, the bottom surface 26 of the groove 24 is accurately concentric or coaxial with the counterbore 23 which is engaged by the enlargement 31 at the contact points 41. If, however, there is a deviation from concentricity or coaxiality, the needle of the dial indicator gauge 128 moves relatively to the graduated dial thereof by amounts which are a measure of the departure from concentricity of the groove bottom surface 26 and counterbore 23.

While measuring is taking place, the plungers 60 maintain the side of the head 30 opposite therefrom in contact with one of their respective bores 22 and one counterbore 23 against which they are thrust by the coil springs 56. If there are two spaced coaxial bores 22, as in the workpiece 12 of Figures 1, 3 and 5 the enlargement 32 with its cylindrical surface 34 acts as an accurate pilot portion in the farther bore 22 while the coaxiality of the nearer groove bottom 26 is being measured relatively to the nearer counterbore 23. After the coaxiality or departure therefrom has been thus measured, the operator again swings the bent lever 164 counterclockwise to again depress the measuring plunger unit 80, enabling the withdrawal of the head 30 from the workpiece 12 when the rounded end 100 of the measuring pin 98 is depressed inwardly of the counterbore 23. To measure the opposite or farther counterbore 24, the operator repeats the procedure by reversing either the workpiece 12 or the instrument 10 from left to right in order to measure the concentricity of the groove 24 which was remote from the groove 24 initially measured.

What I claim is:

1. A bore concentricity gauge for use with a conventional dial indicator for measuring the concentricity of a stepped bore relatively to a main bore of different diameter, said gauge comprising a tubular support having a handle portion adapted to receive the dial indicator, a motion-transmitting member movably mounted in said tubular support and operatively engageable with the operating mechanism of said dial indicator, a measuring head mounted on said support and having a rectilinear guideway thereon disposed transversely to the axis of said support, a measuring plunger reciprocably mounted in said head in guided engagement with said guideway and operatively connected to said motion-transmitting member, said measuring plunger having a measuring tip thereon engageable with the stepped bore, and a measuring plunger depressor mounted on said support and having a plunger-depressing portion engageable with said measuring plunger and an operating portion disposed adjacent said handle portion, said measuring plunger having on the outer end thereof an interrupted arcuate ridge with a recessed gap therein disposed in line with the axis of said measuring plunger, said measuring tip being removably mounted in said recessed gap, said ridge being movable unitarily with said measuring plunger and directed circumferentially of said head on opposite sides of said measuring tip.

2. A bore concentricity gauge for use with a conventional dial indicator for measuring the concentricity of a stepped bore relatively to a main bore of different diameter, said gauge comprising a tubular support having a handle portion adapted to receive the dial indicator, a motion-transmitting member movably mounted in said tubular support and operatively engageable with the operating mechanism of said dial indicator, a measuring head mounted on said support and having a rectilinear guideway thereon disposed transversely to the axis of said support, a measuring plunger reciprocably mounted in said head in guided engagement with said guideway and operatively connected to said motion-transmitting member, said measuring plunger having a measuring tip thereon engageable with the stepped bore, and a measuring plunger depressor mounted on said support and having a plunger-depressing portion engageable with said measuring plunger and an operating portion disposed adjacent said handle portion, said head in the portion thereof occupied by said measuring plunger having curved surfaces thereon of different centration intersecting in lines of intersection forming circumferentially-spaced bore-contacting lines at their places of intersection positioned to center said head within the bore engaged thereby.

References Cited in the file of this patent

UNITED STATES PATENTS

| | | |
|---|---|---|
| 1,048,073 | Hirth | Dec. 24, 1912 |
| 1,329,456 | Carpenter | Feb. 3, 1920 |
| 1,431,615 | Wittner | Oct. 10, 1922 |
| 1,845,359 | Stein | Feb. 16, 1932 |
| 1,863,673 | Schraven | June 21, 1932 |
| 2,362,203 | Horton | Nov. 7, 1944 |
| 2,454,246 | Worthen | Nov. 16, 1948 |
| 2,566,970 | Swensson | Sept. 4, 1951 |
| 2,679,107 | Gondek | May 25, 1954 |
| 2,749,620 | Gzaplinski | June 12, 1956 |

FOREIGN PATENTS

| | | |
|---|---|---|
| 881,063 | France | Apr. 14, 1943 |
| 646,248 | Great Britain | Nov. 15, 1950 |
| 976,537 | France | Mar. 19, 1951 |
| 682,790 | Great Britain | Nov. 19, 1952 |